United States Patent
Osborne

(10) Patent No.: US 10,407,348 B2
(45) Date of Patent: Sep. 10, 2019

(54) SPHERICAL BED TOPPING/HOLD-DOWN MEDIA FOR AN AUTOTHERMAL REFORMATION/SECONDARY REFORMATION UNIT

(71) Applicant: Brian K. Osborne, Saint Louis, MO (US)

(72) Inventor: Brian K. Osborne, Saint Louis, MO (US)

(73) Assignee: O'Brien Asset Management, LLC, Saint Louis, MO (US)

( * ) Notice: Subject to any disclaimer, the term of this patent is extended or adjusted under 35 U.S.C. 154(b) by 139 days.

(21) Appl. No.: 15/696,596

(22) Filed: Sep. 6, 2017

(65) Prior Publication Data

US 2018/0290930 A1 Oct. 11, 2018

Related U.S. Application Data

(60) Provisional application No. 62/483,507, filed on Apr. 10, 2017.

(51) Int. Cl.

| | |
|---|---|
| *C04B 35/48* | (2006.01) |
| *C01B 3/38* | (2006.01) |
| *B01J 8/02* | (2006.01) |
| *B01J 19/02* | (2006.01) |
| *C01B 3/40* | (2006.01) |
| *B01J 19/30* | (2006.01) |
| *B01J 8/04* | (2006.01) |
| *C04B 35/486* | (2006.01) |
| *C04B 35/488* | (2006.01) |

(52) U.S. Cl.
CPC ............... *C04B 35/48* (2013.01); *B01J 8/025* (2013.01); *B01J 8/0278* (2013.01); *B01J 8/0453* (2013.01); *B01J 19/02* (2013.01); *B01J 19/30* (2013.01); *C01B 3/38* (2013.01); *C01B 3/382* (2013.01); *C01B 3/386* (2013.01); *C01B 3/40* (2013.01); *C04B 35/486* (2013.01); *C04B 35/488* (2013.01); *C04B 35/4885* (2013.01); *B01J 2208/00504* (2013.01); *B01J 2208/00884* (2013.01); *B01J 2208/025* (2013.01); *B01J 2219/0263* (2013.01); *B01J 2219/30207* (2013.01); *B01J 2219/30416* (2013.01); *C01B 2203/0244* (2013.01); *C01B 2203/0261* (2013.01); *C01B 2203/0816* (2013.01); *C01B 2203/1005* (2013.01); *C01B 2203/1082* (2013.01); *C01B 2203/1241* (2013.01); *C04B 2235/3217* (2013.01); *C04B 2235/3225* (2013.01); *C04B 2235/3244* (2013.01); *C04B 2235/3246* (2013.01); *C04B 2235/528* (2013.01); *C04B 2235/5427* (2013.01); *C04B 2235/6027* (2013.01); *C04B 2235/77* (2013.01); *C04B 2235/94* (2013.01); *Y02P 20/52* (2015.11)

(58) Field of Classification Search
CPC ..................................................... C04B 35/48
See application file for complete search history.

(56) References Cited

U.S. PATENT DOCUMENTS

| | | | | |
|---|---|---|---|---|
| 6,933,259 B2 * | 8/2005 | Hatanaka | ............. | B01D 53/945 423/263 |
| 7,553,464 B2 * | 6/2009 | Kim | ....................... | B01J 23/002 423/263 |

* cited by examiner

*Primary Examiner* — Stuart L Hendrickson
(74) *Attorney, Agent, or Firm* — C. John Brannon; Brannon Sowers & Cracraft PC

(57) ABSTRACT

A generally spherical high strength ceramic body for use in an ATR and/or SR unit covering a catalyst media bed. The ceramic body is a fully stabilized YSZ composite composition having at least about 13% yttria YSZ, and more typically from about 12% to about 20% yttria YSZ, with a porosity of less than 20 percent and a diameter of at least 25 mm and, more typically, selected from the group comprising 25 mm, 50 mm, 76 mm and 100 mm.

2 Claims, 2 Drawing Sheets

SPHERICAL BED TOPPING/HOLD-DOWN MEDIA FOR AN AUTOTHERMAL REFORMATION/SECONDARY REFORMATION UNIT

CROSS-REFERENCE TO RELATED APPLICATIONS

This patent application claims priority to U.S. provisional patent application Ser. No. 62/483,507, filed on Apr. 10, 2017.

TECHNICAL FIELD

The claimed technology relates generally to ceramic materials and, more particularly, to refractory media for emplacement in a secondary reformation (SR) or autothermal reformation (ATR) unit to cover a catalyst bed for catalyzing a reaction during unit operation.

BACKGROUND

Commercial ATR and/or SR units often combust air or oxygen with pre-reformed natural gas and steam or combusting air or oxygen with residual methane, such as from a tubular reformer, through a bed of refractory media as part of their operational design. For example, SR or ATR units are commonly used for production of synthesis gas for producing ammonia, methanol, and the like. Such gas-to-liquid systems direct hot gasses over a catalyst bed to convert hydrocarbons into synthesis gas. However, thermal and/or catalyst media are subject to corrosion and degradation from the combined temperature and chemical reactivity of the hot gasses flowing thereover. In many furnace designs, tile barriers are provided to intercede between rapidly flowing hot gas from the combustion zone and the catalyst media beds, to slow and distribute hot gas flow evenly and both protect the catalyst from direct gas exposure and to help hold the catalyst in position. However, these refractory bodies are likewise directly exposed to hot corrosive gasses.

Another problem with commercial ATR/SR burner design is that alumina vapor generated at the hot gas/catalyst media interface cools as it travels through the catalyst and/or downstream refractory media heat exchanger beds, depositing fine alumina powder coatings thereupon. This alumina powder deposition contributes to ruby formation in the catalyst bed, reducing catalyst efficiency; bed cloggage in general, reducing gas flow-through efficiency; and/or deposition on waste heat media and/or boiler tubes after exiting the ATR/SR that reduces the efficiency of the waste heat reclamation system. All of these factors contribute to efficiency reduction and the more frequent need for shutdown of the system for maintenance, which is costly both in and of itself and in the loss of productivity during the down time.

Thus, there is a need for refractory media for intercession between the burner and the catalyst media that is easily replaced and resistant to both thermal shock and chemical corrosion. The present novel technology addresses this need.

DESCRIPTION OF THE PREFERRED EMBODIMENTS

Figure 1:
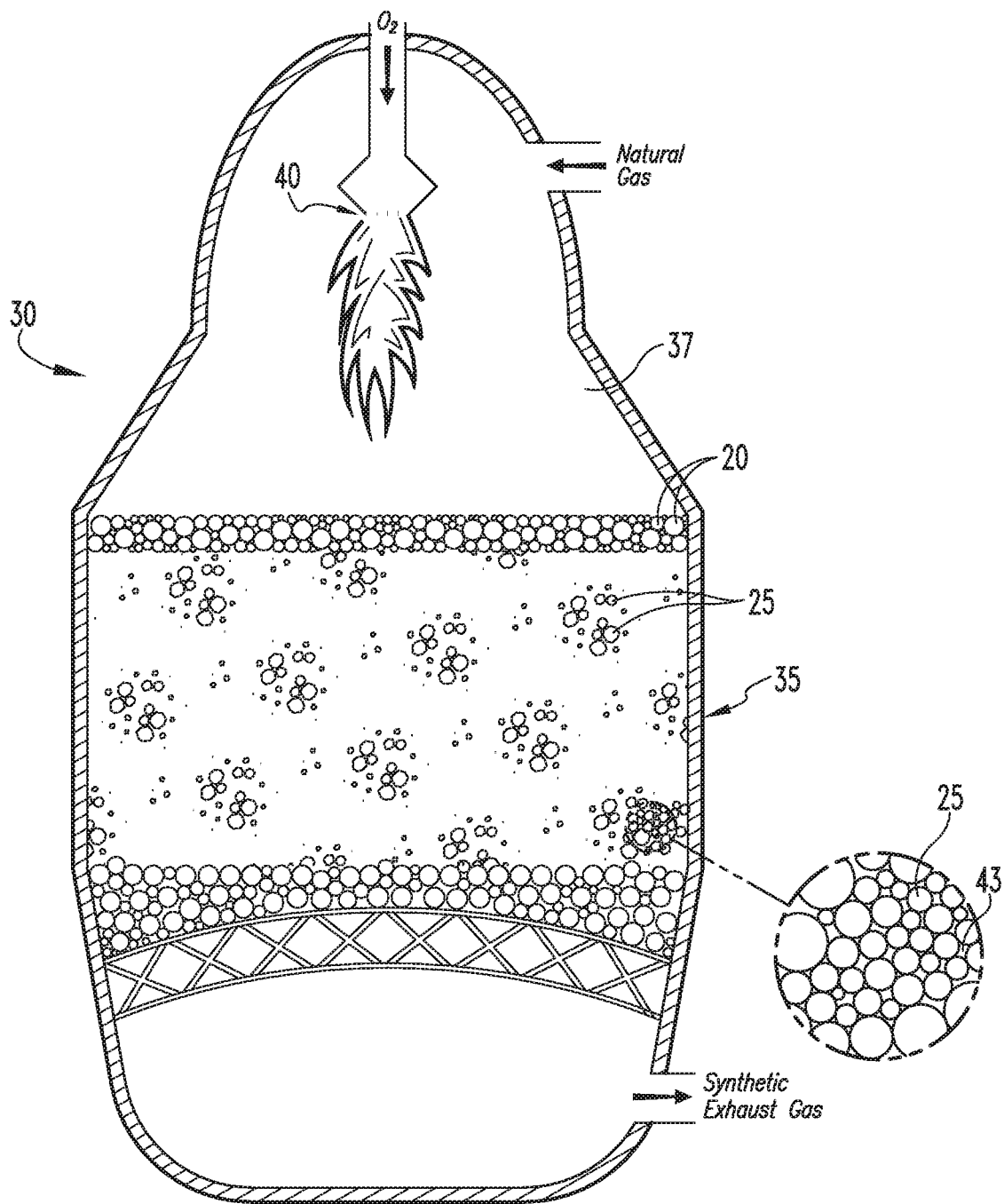
FIG. 1 is a schematic view of a first embodiment SR/ATR system incorporating the spherical refractory target bodies of the present novel technology.

For the purposes of promoting an understanding of the principles of the claimed technology and presenting its currently understood best mode of operation, reference will now be made to the embodiments illustrated in the drawings and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would normally occur to one skilled in the art to which the claimed technology relates.

Figure 2:
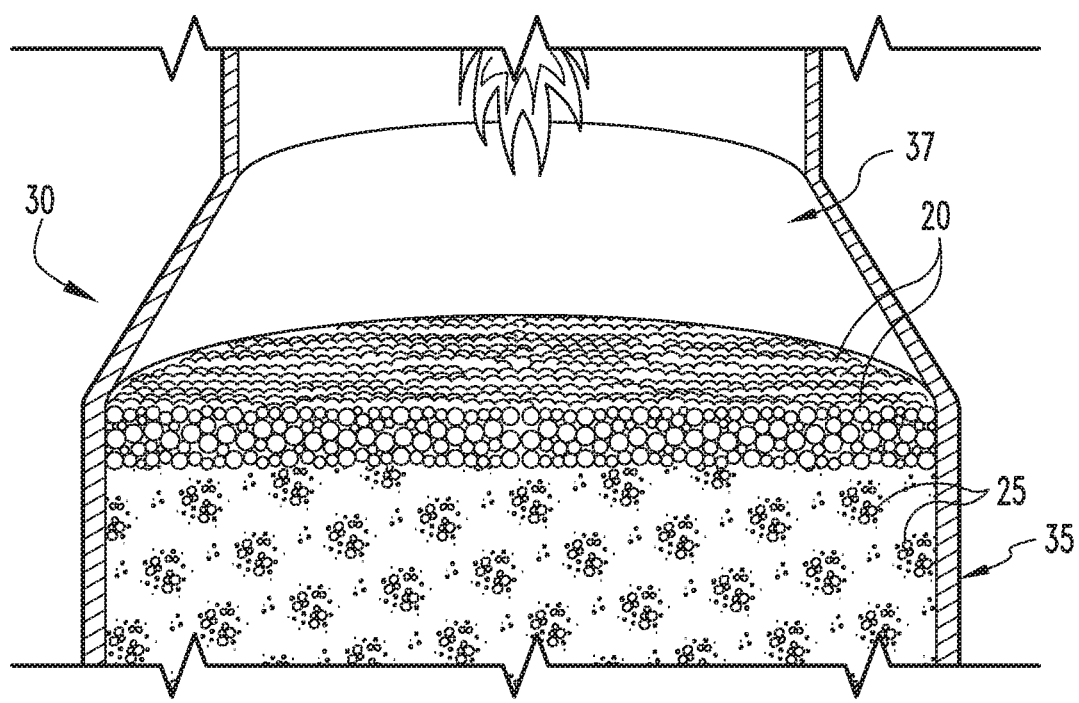
FIG. 2 is a partial perspective cutaway view of the target layer as composed of a plurality of YSZ balls of the present novel technology.

As shown in FIGS. 1-2, the novel technology described and claimed herein relates to generally spherical, typically fully yttria stabilized zirconia (YSZ) or alumina, refractory bodies 20 for use in covering catalytic bed media 25 in SR/ATR systems 30. In general, the invention relates to SR or ATR-systems 30 having a media bed 35 design wherein the hot combustion gas from the currently active burner 40 is directed onto catalyst media 25 for catalysis of the active component of the gasses. The system 30 typically includes a plurality of catalyst media 25 defining a bed 35 to afford increased surface area for catalyzing chemical reactions in the hot gas passing through from the combustion chamber portion 37 of the burner system 30 to yield a synthesis gas.

Catalyst media bodies 25 are typically pellet or cog shaped, but may include any convenient shape. Typically, catalyst media bodies 25 are between about 13 and 25 mm in diameter. The catalyst bodies 25 are typically formed from a high alumina precursor, typically 95-99 weight percent alumina, and sometimes as much as 99.9 weight percent alumina or more, with the remainder being between about 0.1 and about 0.5 weight percent silica, iron oxide, titania, calcia and soda, although other compositions may be selected. The catalyst media bodies 25 are essentially refractory bodies, typically high alumina or calcium aluminate, that have been coated or impregnated with nickel or a like catalyst material. The catalyst bodies 25 may be solid or they may be perforated with one or more apertures 45 for regulating gas flow therethrough.

The refractory hold-down or target bodies 20 are typically spherically shaped, although they may take other convenient shapes. The target bodies 20 are typically about twenty-five (25) mm, fifty (50) mm, seventy-six (76) mm in diameter, or a combination thereof, although other sizes in excess of seventy-six mm in diameter may be selected, such as 100 mm or more.

The target bodies 20 are typically yttria stabilized zirconia. The YSZ bodies are typically fully stabilized. The target bodies are fully stabilized, and typically contain between 6% and 20% yttria, more typically contain between about 8% and about 20% yttria, still more typically between 12% and 16% yttria, and small amounts (typically 1%-3%) alumina, with the balance being zirconia with trace amounts of other metal oxides. One typical composition is thirteen percent (13%) YSZ, with the balance being alumina, as given in the table below:

| Chemistry | WT % |
|---|---|
| $Al_2O_3$ | 2.76 |
| $Na_2O$ | 0.01 |
| $SiO_2$ | 0.08 |
| CaO | 0.75 |
| $Fe_2O_3$ | 0.07 |
| $TiO_2$ | 0.20 |
| $Zr_2O$ | 82.04 |
| MgO | 0.01 |
| $K_2O$ | 0.01 |
| Yttria | 13.03 |
| Other | 1.05 |
| Total | 100.00 |
| $Zr_2O + Y_2O_3$ | 95.07 |

The target bodies 20 are typically sintered to achieve density and desired microstructural characteristics, and more typically exhibit a porosity of about 5 percent or less, more typically less than 3 percent, but may typically be as great as about 20 percent. However, the bodies may be calcined after formation, or simply used as cast or otherwise formed.

The target bodies 20 typically have a relatively high thermal conductivity to further minimize thermal shock damage, the target bodies 20 are typically characterized with a very homogeneous microstructure.

The spherical target bodies 20 are typically formed to shape using a formation technique that lends itself to bodies characterized by high homogeneity and low likelihood of lamination defects, such as slip casting, vibration casting, self-flow casting, hydraulic pressing, nodulizing, and the like. The bodies 20 may be sintered, or may be calcined after formation, or may be provided as-cast. In one embodiment, the bodies 20 are cast from a colloid-based precursor having the composition

| Chemistry | WT % |
|---|---|
| $Al_2O_3$ | 0.25 |
| $SiO_2$ | 0.06 |
| CaO | 0.13 |
| $Fe_2O_3$ | 0.06 |
| $TiO_2$ | 0.20 |
| $Zr_2O$ | 85.52 |
| Yttria | 13.78 |
| Total | 100.00 |
| $Zr_2O + Y_2O_3$ | 99.31 |

In use, the spherical target bodies 20 are layered in a SR/ATR unit 30 over a bed 35 of catalyst 25, more typically between the combustion chamber 37 and the catalyst media bed 35, wherein the bed 35 may be thought of as including catalyst media 25 and a network of air passages 43 infiltrating the same. Likewise, the plurality of inert target bodies 20 may be considered a cover bed or target surface 50 defining a network of air passages 51 connecting to the catalyst bed passages 43 in fluidic communication. The target bodies 20 are typically of a single size, but alternately may be provided in a blend of sizes, or in layers. The bodies 20 are typically randomly positioned adjacent one another to define a contiguous spherical target body surface 50, with each respective body 20 in contact with at least one other body 20, and typically a plurality of other bodies 20.

The large size and high density of the YSZ composition of the inert target bodies 20 provides increased stability against unintended repositioning, such as may occur if the catalyst bed media 25 dislodge, erode, and/or degrade under the bodies 20, if the bodies 20 experience turbulent flow of gasses thereover, during reverse flow (upflow) of the gasses thereover, and the like.

Example 1

A plurality of large refractory catalyst media bodies 25 is fabricated and positioned in a SR/ATR 30 to define a bed 35. The composition of the bodies 25 is high alumina/calcium aluminate impregnated with nickel catalyst.

A plurality of spherical refractory bodies 20 is positioned over the bed 35 to define a porous, contiguous floor or hold down layer. Each respective spherical body 20 is fifty (50) mm in diameter, and is composed of a fully stabilized 13% yttria YSZ inert refractory material.

Example 2

A plurality of spherical catalyst media bodies 25 is fabricated and positioned in a SR/ATR 30 to define a bed 35. Spherical target layer bodies 20 are positioned over the bed 35 to define a porous, contiguous floor or hold-down layer. Each respective spherical body is seventy-six (76) mm diameters in diameter, and is composed of a fully stabilized YSZ having 13 weight percent yttria, 3 weight percent alumina, trace amounts of other metal oxides, with the balance being zirconia.

Example 3

A plurality of catalyst media bodies 25 are fabricated and positioned in a SR/ATR 30 to define a bed 35. The composition of the bodies 25 is high alumina, coated with catalyst metal.

A plurality of spherical inert target bodies 20 are positioned over the bed 35 to define a contiguous floor/hold down layer and a network of gas flow passages therethrough. Each respective body 20 has a diameter of either 25, 50 or 76 mm and is composed of stabilized YSZ, with yttria being between 12% and 16% of the composition.

Example 4

A large plurality of cast spherical refractory media bodies 20 are fabricated, and positioned in a SR/ATR 30 over a catalyst media bed 35. Each respective spherical body 20 is selected from the group including 25, 50 and 76 mm in diameter. The composition of the bodies 20 is fully stabilized YSZ, with about 14% yttria, with the balance being zirconia with trace amounts of other metal oxides.

While the claimed technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the claimed technology are desired to be protected.

I claim:

1. A substantially spherical ceramic body, comprising:
a generally spherical refractory body;

wherein the generally spherical refractory body has a diameter selected from the group consisting 25 mm, 38 mm, 50 mm, 76 mm, and 100 mm;

wherein the body is substantially YSZ, having a combined yttria and zirconia content of between about 95 weight percent and about 99 weight percent;

wherein the body has trace amount of impurities selected from the group consisting of alumina, silica, calcia, $Fe_2O_3$, titania, magnesia, $Na_2O$, and $K_2O$;

wherein the YSZ is fully stabilized.

2. The substantially spherical body of claim 1, wherein the alumina content is about 3 weight percent; wherein the zirconia content is about 82 weight percent; wherein the yttria content is about 13 weight percent; and wherein the combined zirconia and yttria content is about 95 weight percent.

* * * * *